United States Patent [19]

Weng

[11] Patent Number: 4,914,535
[45] Date of Patent: Apr. 3, 1990

[54] SYNCHRONIZATION FOR STORED DATA

[75] Inventor: Lih-Jyh Weng, Lexington, Mass.

[73] Assignee: Digital Equipment Corporation, Maynard, Mass.

[21] Appl. No.: 141,204

[22] Filed: Jan. 6, 1988

[51] Int. Cl.[4] ........................... G11B 5/09; G11B 15/8
[52] U.S. Cl. ....................................... 360/72.2; 360/49
[58] Field of Search ................... 360/48, 39, 40, 72.2, 360/49; 371/38, 39

[56] References Cited

U.S. PATENT DOCUMENTS

| | | | |
|---|---|---|---|
| 4,345,280 | 8/1982 | Blagaila et al. | 360/49 |
| 4,413,339 | 11/1983 | Riggle et al. | 371/38 |
| 4,503,420 | 3/1985 | Rub et al. | 340/347 |
| 4,506,252 | 3/1985 | Jacoby et al. | 340/347 |
| 4,752,841 | 12/1986 | Syracuse et al. | 360/40 |

FOREIGN PATENT DOCUMENTS

| | | |
|---|---|---|
| 0144813 | 6/1985 | European Pat. Off. . |
| 0180100 | 5/1986 | European Pat. Off. . |
| 0248536 | 5/1987 | European Pat. Off. . |
| 0234957 | 9/1987 | European Pat. Off. . |

*Primary Examiner*—Vincent P. Canney
*Attorney, Agent, or Firm*—Fish & Richardson

[57] ABSTRACT

The location of the sequence of data bits stored on a storage medium is identified by generating a predetermined synchronization bit sequence; storing on the storage medium a bit sequence corresponding to the predetermined synchronization sequence to indicate the location of the data bit sequence; deriving from the stored corresponding bit sequence on the storage medium a trial sequence; and determining whether the trial sequence corresponds to the predetermined synchronization sequence by determining the number of symbols in which the trial sequence differs from the predetermined synchronization sequence, each symbol comprising a plurality of bits, whereby the effect of clustered bit errors is reduced. The stored data bits are encoded from raw data bits in accordance with a code in which raw data symbols are encoded as data bit groups of at least two different lengths; a bit sequence corresponding to the synchronization sequence is stored on the medium as an indication of the location of the stored data bits; and the synchronization sequence comprises a sequence of raw data symbols which encode as stored encoded groups all of a single length, whereby error propagation is reduced.

29 Claims, 1 Drawing Sheet

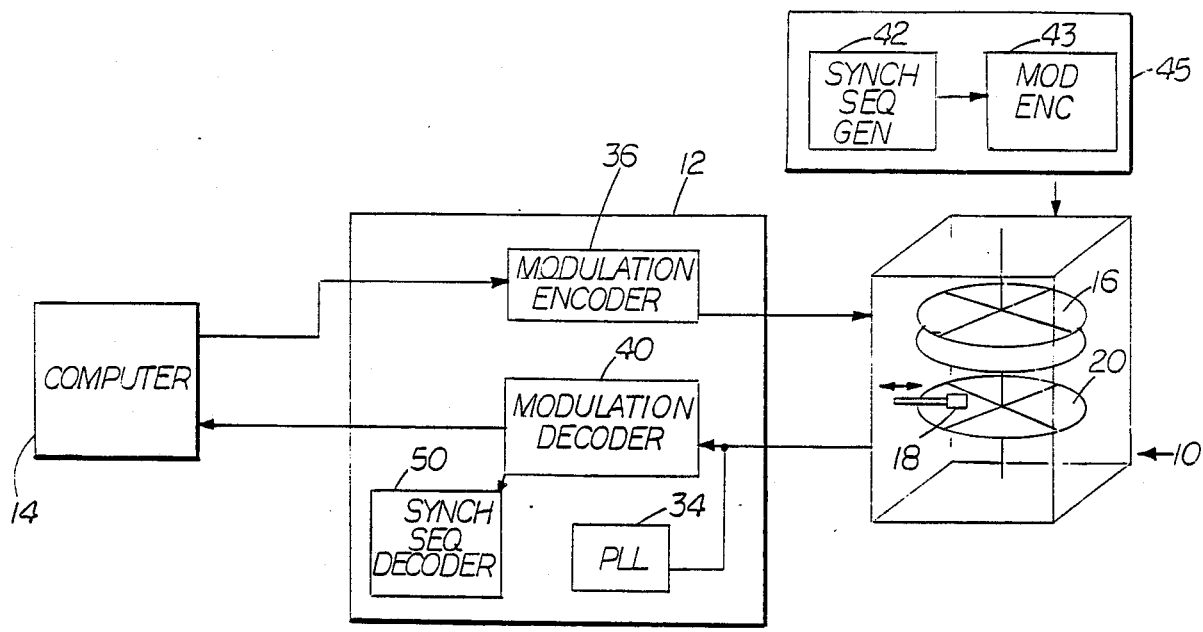

FIG. 1

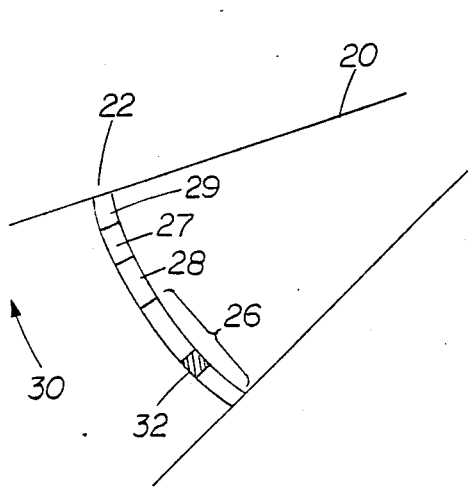

FIG. 2

$\overbrace{\ldots 0 0 0 0 0}^{46} \underbrace{2 1 1 1 0}_{48}$ ⤶44

FIG. 3

$\ldots 0 0 0 0 0 2 1 1 1 0$
$\phantom{\ldots 0 0 0 0 0}2 1 1 1 0$
$\phantom{\ldots 0 0 0 0 0}\checkmark \checkmark \checkmark \checkmark \checkmark = 5$ $\ldots 0 0 0 0 0 2 1 1 1 0$
$\phantom{\ldots 0 0 0 0}2 1 1 1 0$
$\phantom{\ldots 0 0 0 0}\checkmark \checkmark \checkmark \checkmark \checkmark = 5$ $\ldots 0 0 0 0 0 2 1 1 1 0$
$\phantom{\ldots 0 0 0}2 1 1 1 0$
$\phantom{\ldots 0 0 0}\checkmark \checkmark \checkmark \phantom{1} \checkmark = 4$ $\ldots 0 0 0 0 0 2 1 1 1 0$
$\phantom{\ldots 0 0}2 1 1 1 0$
$\phantom{\ldots 0 0}\checkmark \checkmark \phantom{1 1}\checkmark = 3$

FIG. 4

SYNCHRONIZATION FOR STORED DATA

BACKGROUND OF THE INVENTION

This invention relates to identifying the location of a sequence of data bits on a storage medium.

Data stored on a mass storage device such as a magnetic disk is typically organized in sectors. In each sector the sequence of data bits is immediately preceded by a predetermined synchronization sequence (the same synchronization sequence is used for each sector). Thus the synchronization sequence effectively points to the place where the data bit sequence begins. Each sector also includes a header address; a second synchronization sequence points to the beginning of the header address.

One known synchronization sequence—a long string of zero-valued bits followed by a final one-valued bit—works well if the bit error rate for the storage medium is low (for example, on the order of $10^{-12}$).

More complicated synchronization sequences of binary bits can cope with larger error rates, e.g., on the order of $10^{-10}$ or $10^{-9}$.

SUMMARY OF THE INVENTION

A general feature of the invention provides a method of identifying the location of a stored sequence of data bits in which a predetermined synchronization bit sequence is first generated; a bit sequence derived from the predetermined synchronization sequence is then stored on the storage medium to indicate the location of the data bit sequence; a trial sequence is derived from the stored bit sequence corresponding to the predetermined synchronization sequence; and a determination is made whether the derived trial sequence corresponds to the predetermined synchronization sequence by determining the number of symbols in which the trial sequence differs from the predetermined synchronization sequence, each symbol comprising a plurality of bits, whereby the effect of clustered bit errors is reduced.

Another general feature of the invention is a method for identifying the location of a stored sequence of data bits that are encoded from raw data bits in accordance with a code in which raw data bits are encoded as encoded bit groups of at least two different lengths; the method includes generating a predetermined synchronization sequence; and storing on the storage medium a bit sequence corresponding to the synchronization sequence to indicate the location of the stored data bits; the synchronization sequence is a sequence of raw data symbols which encode as bit groups all of a single length, whereby error propagation is reduced.

Preferred embodiments include the following features.

The predetermined synchronization sequence is chosen so that the number of symbols by which the predetermined synchronization sequence differs from any version of the predetermined sequence shifted by one or more bits in a particular direction is no less than a minimum distance of D symbols. Each symbol in the synchronization sequence comprises two bits. The synchronization sequence has at least one zero-valued symbol followed by a predetermined sequence of N symbols, N an integer, and the trial sequence includes N successive symbols of the synchronization sequence. A succession of trial sequences is derived and the number of symbols in which each trial sequence differs from the predetermined synchronization sequence is determined.

A determination is made that the synchronization sequence has been found if the number of symbols by which the trial sequence differs from the predetermined sequence is no greater than $(D-1)/2$.

The storage medium is a ferro-magnetic rotatable disk, the bits of the data sequence and the bit sequence corresponding to the synchronization sequence are stored serially along a track of the disk, a bit having a first value is stored as a transition of magnetization polarity while a bit having a second value is stored by an absence of such a transition, and the bit sequence corresponding to the synchronization sequence immediately precedes the sequence of data bits on the disk.

Groups of raw data bits of two different lengths are mapped into groups of encoded data bits in accordance with a rate $\frac{2}{3}$ variable length modulation code, the symbols of the predetermined synchronization sequence are all of one length and are encoded for storage in accordance with the rate $\frac{2}{3}$ variable length modulation code. The rate $\frac{2}{3}$ code is characterized in that two-bit long groups of raw data bits are mapped into three-bit long groups of encoded data bits, four-bit long groups of raw data bits are encoded into six-bit long groups of encoded data bits, and each symbol of the predetermined synchronization sequence is two bits long. The groups of raw data bits are mapped into groups of encoded data bits according to the following table:

| Raw Data Bits | Encoded Bits |
| --- | --- |
| 00 | x00 |
| 01 | x01 |
| 10 | 010 |
| 1100 | x00000 |
| 1101 | x00001 |
| 1110 | 010000 |
| 1111 | 010001 |

(Where x denotes the complement of the previous encoded bit), and each symbol of the predetermined synchronization sequence is chosen from the set of symbols 00, 01, and 10.

The symbols are drawn from an alphabet of symbols 0, 1, 2 respectively representing the bit pairs 00, 01, and 10. In specific predetermined synchronization sequences, there is at least one leading zero followed by one of the following symbol sequences: 21110, 211101, 2220210, 222210201, 2220110210, 111102210201, 22211101102101, 22111010110210, 22210222021011020, 2222110222202021021, 221111011021101102021, or 2222111021102101101101.

The synchronization sequence is usable in accordance with the tree code but is not subject to the error propagation problems inherent in the full tree code used for storing the data bits. By precluding any occurrence of the bit sequence 01, 10, errors that would result from a one bit slippage of the sequence are more likely to be sensed. The synchronization sequences are effective with any number of leading zeros. Treating Hamming distance on a symbol-by-symbol basis is effective with respect to clustered bit errors.

Other advantages and features will become apparent from the following description of the preferred embodiment, and from the claims.

DESCRIPTION OF THE PREFERRED EMBODIMENT

We first briefly describe the drawings.

FIG. 1 is a block diagram of a disk storage system for a computer.

FIG. 2 is a top diagrammatic view of a sector of a disk.

FIG. 3 is a synchronization sequence.

FIG. 4 illustrates a computation of minimum Hamming distance.

STRUCTURE AND OPERATION

Referring to FIG. 1, a magnetic disk mass storage unit 10 is connected via a disk controller 12 to a host computer 14 which needs to store and retrieve data on storage unit 10. Storage unit 10 contains a stack of rotating magnetic disks 16 each of which bears a ferro-magnetic surface and is served by a magnetic read/write head 18. Each head 18 is movable radially relative to its associated disk (by a conventional mechanism not shown) to enable the head to be quickly positioned at any one of a large number of concentric storage tracks on disk 16. Disk controller 12 (which includes a microprocessor, not shown) responds to read/write requests from computer 14 by either writing the given data on the disk at the named sector or reading the disk at the named sector and passing the data back to the computer.

The storage space on each disk is organized in many pie-shaped sectors 20. Referring to FIG. 2, the portion of each track 22 that lies within a given sector 24 stores a sequence of data bits 26, and another sequence of data bits representing a unique identifying header address 27 that enables that sector of that track to be located for writing or reading data. A bit sequence 28 used for synchronization purpose is also stored on track portion 22 in a position such that when disk 16 is rotated in the direction indicated by arrow 30, the magnetic head reads the bit sequence 28 immediately before it encounters data sequence 26. A second synchronization bit sequence 29 is read immediately before header address 27.

The ferro-magnetic material on the disk can be made to have either one of two opposite polarities at selected locations on the disk. Bits are stored along track 22 in a series of cells 32. Within each cell 32 a state transition from one polarity to the opposite polarity represents a one-valued bit, while a constant polarity (no transition) represents a zero-valued bit.

In order to synchronize the reading of successive bits with the appearances of successive cells 32 opposite head 18, a phase locked loop (PLL) circuit 34 (FIG. 1) in disk controller 12 senses the appearance of polarity transitions (one-valued bits) read from the disk. For effective operation, PLL 34 requires that transitions (one-valued bits) appear relatively frequently along the track. To assure this, when a stream of raw data bits (from computer 14) are to be written on a track, they are first encoded by a modulation encoder 36 (in disk controller 12) in accordance with a so-called tree code (of the type described in Rub et al., U.S. Pat. No. 4,503,420, filed Mar. 5, 1985, and assigned to the same assignee as this application). Disk controller 12 also includes a modulation decoder 40 for decoding the retrieved bits read from the disk in accordance with the tree code.

To aid rapid, accurate identification of the location of the start of data bits in a given sector, when the disk is manufactured a special synchronization sequence is generated by a synchronization sequence generator 42 (FIG. 1) and the sequence is passed through a modulation encoder 43 (like modulation encoder 36) to form a corresponding bit sequence 28 or bit sequence 29 (FIG. 2) for recording. Sequence generator 42 and encoder 43 are part of a formatter 45.

The invention is also useful in other types of storage, e.g., optical.

The tree code is a rate ⅔ code (i.e., on average it adds one redundant bit per two raw data bits) in which the mapping of groups of raw data bits to encoded bit groups is as follows (where x denotes the complement of the previous encoded bit).

| Raw Data Bits | Encoded Bits |
| --- | --- |
| 00 | x00 |
| 01 | x01 |
| 10 | 010 |
| 1100 | x00000 |
| 1101 | x00001 |
| 1110 | 010000 |
| 1111 | 010001 |

For each group of raw data bits to be encoded, if the first two raw data bits are one-valued, the encoder takes a group of four raw data bits for encoding. Otherwise, the encoder takes a group of two bits. In this code, the second and third bits of a three-bit encoded bit group have the same binary values as the first and second raw data bits, and the second and sixth bits of a six-bit coded word respectively have the same binary values as the third and fourth raw data bits. The result of this arrangement is a reduction in error propagation and a simplification of decoding.

In decoding, the first step is to determine whether the block of retrieved bits consists of 4 bits or 6 bits. If bits 3, 4, or 5 (where the most significant bit is bit 1) are zero-valued, the retrieved block is assumed to contain 6 bits, otherwise it is assumed to have only 4 bits. The second step is to translate the retrieved block back to a group of raw data bits. Bit errors in a retrieved block may cause an erroneous determination of the block size which may produce an incorrect decoding not only of that block, but (through error propagation) errors in decoding of subsequent blocks as well.

Referring to FIG. 3, each synchronization sequence 44 may begin with the usual sequence of leading zeroes 46 followed by a sequence 48 of five ternary symbols selected from an alphabet consisting of the ternary symbols 0, 1, and 2, which respectively represent bit pairs 00, 01, and 10. The symbol sequence 48 is carefully chosen to maximize the minimum Hamming distance between the symbol sequence and any shifted version of the symbol sequence which has been shifted to the left by one or more bits, where the Hamming distance is the number of symbol positions in which the two sequences differ.

Referring to FIG. 4, the minimum Hamming distance (represented by the number of checkmarks, each indicating a symbol position in which the symbols differ) can be seen to be 3, because all other Hamming distances between the sequence 44 and shifted versions of sequence 44 (as illustrated in FIG. 3) are greater than 3. For simplicity, FIG. 3 shows only the Hamming distance for shifted versions of the symbol sequence that have been shifted by one or more full symbols.

In general, an N-symbol sequence having a minimum Hamming distance of D symbols is capable of correct determination of the synchronization position if fewer than $(D-1)/2$ symbol errors exist per N symbols in the sequence 44. In the example given, for N=5, and D=3, any single symbol error in each 5 symbols will not prevent correct determination of the synchronization position.

During reading, to identify the synchronization sequence, a synchronization sequence decoder 50 compares the known correct synchronization sequence with successive 5-symbol trial sequences drawn from the modulation decoded (and possibly bit-error corrupted) sequence read from the storage medium. Decoder 50 calculates the Hamming distance between each trial sequence and the known correct sequence. As soon as the distance is found to be $(D-1)/2$ or less (i.e., one or less in our example where D=3), controller 12 begins to pass the subsequent symbols through as data (or a header address, as the case may be) to computer 14.

In making the distance measurements, each trial sequence is formed by taking one new bit and dropping the oldest bit from previous trial sequence. In this way two sets of distance measurements are formed: one set comprises every other measurement and represents one possible symbol boundary arrangement; the other set comprises the intervening measurements and represents the other possible symbol boundary arrangement. As soon as a distance is found to be $(D-1)/2$ or less, the controller begins to pass the subsequent symbols to the computer using the symbol boundaries indicated by the set of measurements which contained the distance $(D-1)/2$ or less. Thus it is unnecessary to know the symbol boundaries in advance.

The following characteristics of the synchronization sequence 44 should be noted.

First, because it uses only the bit sequences 00, 01, 10, the tree code, when applied by encoder 43 to the synchronization sequence, will not be subject to error propagation, for the raw data bit groups (and in turn the blocks of encoded bits) are only of one length.

Second, in order to improve the error detection capability in the face of a possible one bit slippage of a portion or all of the read back sequence, the ternary symbol 1 is never permitted to be followed by the ternary symbol 2. This precludes a bit sequence . . . , 01, 10, . . . which, upon a single bit slippage would become . . . , 0.0, 11, 0, violating the rule that excludes the bit sequence 11.

Third, the synchronization sequence works equally well regardless of the number of leading zeros. For example, referring again to FIG. 4, it can be seen that even if the read back sequence had only one leading zero, the minimum distance would still be 3 and decoding would be unaffected.

Fourth, using a symbol-by-symbol approach for measuring Hamming distance (rather than a bit-by-bit approach), both in selecting and in decoding the synchronization sequence, enables the scheme to cope effectively with bit errors that appear in clusters, as well as random errors. This is apparent because, for example, two symbols will be found different if they differ in either one or both bit positions so that two successive bit errors within a symbol has no greater effect on the measurement of minimum distance on a symbol-by-symbol basis than one bit error within the symbol. This is especially useful in transition-type recording where a bit error in one bit cell produces an additional bit error in an adjacent bit cell.

The following table shows optimal synchronization sequences of various lengths, generated by a computer. Each sequence is optimal in the sense of having the minimum number of occurrences of the minimum distance. Where a tree code is used and the raw bit error rate is several orders of magnitude worse than presently available disk driver, and assuming flux reversal errors are statistically independent, then as the number of symbols in the synchronization sequence increases, the synchronization error rate continues to improve until the 20 symbol length sequence is reached.

| Length in Distance Symbols (N) | Length in Bits (2N) | Synchronization Sequence | Minimum Distance (in symbols) |
|---|---|---|---|
| 5 | 10 | 21110 | 3 |
| 6 | 12 | 211101 | 4 |
| 7 | 14 | 2220210 | 5 |
| 9 | 18 | 222210201 | 6 |
| 10 | 20 | 2220110210 | 7 |
| 12 | 24 | 111102210201 | 8 |
| 14 | 28 | 22211101102101 | 9 |
| 15 | 30 | 222111010110201 | 10 |
| 17 | 34 | 22210222021011020 | 11 |
| 18 | 36 | 222211022202021021 | 12 |
| 20 | 40 | 22111101102110102021 | 13 |
| 21 | 42 | 222211102110210110101 | 14 |

Other embodiments are within the following claims.

What is claimed is:

1. A method of identifying the location of a sequence of data bits stored on a storage medium, comprising
   generating a predetermined synchronization sequence of symbols, each said symbol comprising a plurality of bits,
   storing on said storage medium a bit sequence corresponding to said predetermined synchronization sequence to indicate said location of said data bit sequence,
   deriving from said stored corresponding bit sequence on said storage medium a trial sequence of symbols, each said symbol comprising a plurality of bits, and
   determining whether said trial sequence corresponds to said predetermined synchronization sequence by
      comparing said trial sequence with said predetermined synchronization sequence symbol by symbol and, based on said comparing,
      determining the number of symbols in which said trial sequence differs from said predetermined synchronization sequence, whereby the effect of clustered bit errors is reduced.

2. A method of identifying the location of a sequence of data bits stored on a storage medium, said stored data bits being encoded from raw data bits in accordance with a code in which raw data bits are encoded as encoded bit groups of at least two different lengths, comprising
   generating a predetermined synchronization sequence, and
   storing on said storage medium a bit sequence corresponding to said synchronization sequence to indicate said location of said data bit sequence, said synchronization sequence comprising a sequence of raw data symbols which encode, in accordance with said code, as encoded bit groups all of a single length, whereby error propagation is reduced.

3. The method of claim 2 further comprising
   derived from said stored corresponding bit sequence on said storage medium a trial sequence of symbols, and
   determining whether said trial sequence corresponds to said predetermined synchronization sequence by comparing said trial sequence with said predetermined synchronization sequence symbol by symbol and, based on said comparing,
determining the number of symbols in which said trial sequence differs from said predetermined synchronization sequence, each said symbol comprising a plurality of bits, whereby the effect of clustered bit errors is reduced.

4. The method of claim 1 or 3 wherein said synchronization sequence comprises at least one zero-valued symbol followed by a predetermined sequence of N symbols, N an integer, and said trial sequence comprises N successive symbols derived from the stored bit sequence corresponding to the synchronization sequence.

5. The method of claim 1 or 3 wherein said deriving step further comprises deriving a succession of said trial sequences and determining the number of symbols in which each said trial sequence differs from said predetermined synchronization sequence.

6. The method of claim 1 or 3 further comprising determining if said number of symbols in which said trial sequence differs from said predetermined synchronization sequence is less than a predetermined number.

7. The method of claim 1 or 2 wherein said predetermined synchronization sequence is chosen so that the number of symbols by which said predetermined synchronization sequence differs from any version of said predetermined sequence that is shifted by one or more bits in a particular direction is no less than a minimum distance D, and wherein said method further comprises determining that said synchronization sequence has been found if said number of symbols by which said trial sequence differs from said predetermined sequence is no greater than (D−1)/2.

8. The method of claim 1 wherein
said data bits stored on said medium are derived from raw data bits in accordance with a code in which groups of said raw data bits are encoded as sets of encoded bits,
there are at least two different lengths of said sets such that decoding of possibly erroneous encoded bit sets may produce error propagation,
said predetermined synchronization sequence comprises groups of data bits all of one length, and
said corresponding bit sequence is encoded from said predetermined synchronization sequence, whereby error propagation in said synchronization sequence is avoided.

9. The method of claim 1 or 2 wherein groups of raw data bits of two different lengths are mapped into groups of encoded said data bits in accordance with a rate ⅔ variable length modulation code, and said symbols of said predetermined synchronization sequence are all of one said length and are encoded for storage in accordance with said rate ⅔ variable length modulation code.

10. The method of claim 9 wherein said rate ⅔ code is characterized in that two bit-long groups of raw data bits are mapped into three-bit long groups of encoded data bits, four-bit long groups of raw data bits are encoded into six-bit long groups of encoded data bits, and each symbol of said predetermined synchronization sequence is two-bits long.

11. The method of claim 10 wherein groups of raw data bits are mapped into groups of encoded data bits according to the following table:

| Raw Data Bits | Encoded Bits |
| --- | --- |
| 00 | x00 |
| 01 | x01 |
| 10 | 010 |
| 1100 | x00000 |
| 1101 | x00001 |
| 1110 | 010000 |
| 1111 | 010001 |

(where x denotes the complement of the previous encoded bit), and each symbol of said predetermined synchronization sequence is chosen from the set of symbols 00, 01, and 10.

12. The method of claim 1 or 2 wherein said storage medium comprises a ferro-magnetic rotatable disk, said bit sequences are stored serially along a track of said ferro-magnetic disk, said storing includes representing a bit having a first value by a transition of magnetization polarity and a bit having a second value by an absence of a state transition of magnetization polarity, and said stored bit sequence corresponding to said synchronization sequence immediately precedes said sequence of data bits.

13. The method of claim 1 wherein each said symbol comprises two said bits.

14. The method of claim 1 or 2 wherein said symbols are drawn from an alphabet of symbols 0, 1, 2 respectively representing the bit pairs 00, 01, and 10.

15. The method of claim 14 wherein said predetermined synchronization sequence comprises at least one leading zero symbol followed by the symbol sequence 21110.

16. The method of claim 14 wherein said synchronization sequence comprises at least one leading zero followed by the symbol sequence 211101.

17. The method of claim 14 wherein said synchronization sequence comprises at least one leading zero followed by the symbol sequence 2220210.

18. The method of claim 14 wherein said synchronization sequence comprises at least one leading zero followed by the symbol sequence 222210201.

19. The method of claim 14 wherein said synchronization sequence comprises at least one leading zero followed by the symbol sequence 2220110210.

20. The method of claim 14 wherein said synchronization sequence comprises at least one leading zero followed by the symbol sequence 111102210201.

21. The method of claim 14 wherein said synchronization sequence comprises at least one leading zero followed by the symbol sequence 22211101102101.

22. The method of claim 14 wherein said synchronization sequence comprises at least one leading zero followed by the symbol sequence 2221110101110210.

23. The method of claim 14 wherein said synchronization sequence comprises at least one leading zero followed by the symbol sequence 22210222021011020.

24. The method of claim 14 wherein said synchronization sequence comprises at least one leading zero followed by the symbol sequence 222211022202021021.

25. The method of claim 14 wherein said synchronization sequence comprises at least one leading zero followed by the symbol sequence 22111101102110102021.

26. The method of claim 14 wherein said synchronization sequence comprises at least one leading zero followed by the symbol sequence 222211102110210110101.

27. Apparatus for identifying the location of a sequence of data bits stored on a storage medium, comprising circuitry for generating a predetermined synchronization sequence of symbols, each said symbol comprising a plurality of bits, circuitry for storing on said storage medium a bit sequence corresponding to said predetermined synchronization sequence to indicate said location of said data bit sequence, circuitry for deriving a trial sequence of symbols from said bit sequence stored on said storage medium, each said symbol comprising a plurality of bits, and circuitry for determining whether said trial sequence corresponds to said predetermined synchronization sequence by comparing said trial sequence with said predetermined synchronization sequence symbol by symbol and, based on said comparing.

determining the number of symbols in which said trial sequence differs from said predetermined synchronization sequence, whereby the effect of clustered bit errors is reduced.

28. Apparatus for identifying the location of a sequence of data bits stored on a storage medium, said stored data bits being encoded from raw data bits in accordance with a code in which raw data bit symbols are encoded as data bit groups of at least two different lengths, comprising circuitry for generating a predetermined synchronization bit sequence, circuitry for storing on said storage medium a bit sequence corresponding to said synchronization sequence to indicate said location of said data bit sequence, said synchronization sequence comprising a sequence of raw data symbols which encode, in accordance with said code, as stored encoded bit groups all of a single length, whereby error propagation is reduced.

29. Apparatus for synchronizing a read head of a mass storage medium with respect to the beginning of a stored sequence of data bits comprising a synchronization sequence of symbols chosen to maximize the minimum Hamming distance, symbol-by-symbol, of said synchronization sequence and versions of said synchronization sequence that are shifted relative to said synchronization sequence by one or more bits, an encoder for encoding said synchronization sequence in accordance with a code in such a way that all code words into which symbols of said synchronization sequence may be encoded have the same length, circuitry for storing said encoded code words on said medium to indicate the beginning of said stored sequence of data bits, a decoder for reading trial sequences of said stored code words and decoding said trial sequences, and circuitry for determining the Hamming distance, symbol-by-symbol, between each said trial subsequence and said synchronization sequence and for determining said location based on when said Hamming distance falls below a predetermined value.

* * * * *